R. E. TOMPKINS.
CASTER.
APPLICATION FILED SEPT. 4, 1914.

1,135,226.

Patented Apr. 13, 1915.

Witnesses
Robert M. Sutphen
A. I. Hind

Inventor
R. E. TOMPKINS
By Watson E. Coleman
Attorney

UNITED STATES PATENT OFFICE.

RICHARD EUGENE TOMPKINS, OF DANBURY, CONNECTICUT.

CASTER.

1,135,226.  Specification of Letters Patent. Patented Apr. 13, 1915.

Application filed September 4, 1914. Serial No. 860,277.

*To all whom it may concern:*

Be it known that I, RICHARD EUGENE TOMPKINS, a citizen of the United States, residing at Danbury, in the county of Fairfield and State of Connecticut, have invented certain new and useful Improvements in Casters, of which the following is a specification, reference being had to the accompanying drawings.

This invention relates to new and useful improvements in casters, and particularly ball bearing casters.

An object of this invention is the provision of a caster which comprises a caster ball which is partially inclosed within a casing, the caster ball being maintained in spaced relation from the interior of the casing by a series of bearing balls.

A further object of this invention is the provision of a caster which comprises a caster ball partially inclosed within a casing, the casing being formed to provide a pair of race ways to receive bearing balls, the bearing balls being arranged above and below the horizontal axis of rotation of the caster ball.

With these and other objects in view, my invention consists in the novel construction, combination, and arrangement of parts, to be hereinafter more fully described, claimed, and illustrated in the accompanying drawing, in which—

Figure 1:
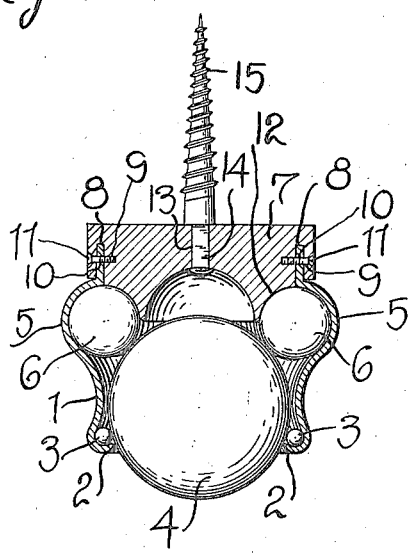
Figure 2:
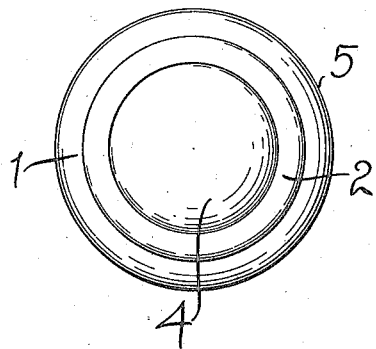

Figure 1 is a vertical sectional view of my improved caster; and Fig. 2 is a bottom plan view thereof.

Referring more particularly to the drawing, the numeral 1 designates a hollow casing which is provided at its lower end with an inwardly curled flange 2, the flange providing a race way for an annular series of bearing balls 3. A caster ball 4 is disposed within the casing through its upper end, and as the distance between opposite points of the edge of the flange 2 is less than the length of the axis of the caster ball 4, the main portion of the caster ball is inclosed within the casing with a portion thereof projecting below the casing, the ball at a point below its horizontal axis of rotation engaging the series of bearing balls 3. The casing 1 adjacent its upper end is bulged outwardly as at 5 to receive an annular series of bearing balls 6, the balls 6 being relatively larger than the balls 3, and engaging against the caster ball 4 above the horizontal axis of rotation thereof.

A cap 7 is provided to close the upper end of the casing 1, the cap being provided on its under face adjacent the marginal edge thereof with an annular groove 8, to receive the upper edge of the casing. The groove 8 is of sufficient length to entirely inclose the portion of the casing which projects upwardly from the bulged portion 5 thereof, so that the upper edge of the casing engages against the upper wall of the groove, and the lower face of the cap outwardly of the groove bears against the bulged portion 5 of the casing. Formed in the cap 7 are threaded openings 9 which are adapted to register with openings 10 which are formed in the casing above the bulged portion thereof, the registering openings being adapted to receive set screws 11, whereby the cap is secured in position to close the upper end of the casing. The under face of the cap 7 which is disposed within the casing is provided with an annular groove 12 which groove in conjunction with the bulged portion 5 of the casing comprises a race way for the series of balls 6 to hold the same closely engaged against the caster ball 4. Formed centrally in the cap 7 is a vertical angular opening 13 through which the angular portion 14 of the head of an upwardly extending screw 15 is adapted to pass, the extremity of the head of the screw being swaged against the under face of the cap, and by providing the angular portion 14 which engages in the angular opening, relative turning of the screw and casing is prevented.

From the above description taken in connection with the accompanying drawing, it will be seen that I have provided a caster in which the caster ball is entirely spaced from the casing by a series of bearing balls, in which manner friction is reduced to a minimum. It will be seen that the cap 7 holds the various parts of the device in their respective positions, and should one of the bearing balls become broken, it is merely necessary to disengage the set screws 11 from their engagement with the casing and the cap so that the casing may be disengaged from the cap and the broken ball replaced by a new one without the necessity of removing the screw 15 from the article of furniture in which it is engaged.

My improved caster is easily assembled, by inverting the casing and placing the ball 4 therein, so that the series 3 of the smaller bearing balls may be dropped in the casing against the caster ball, so that when the caster ball is moved to its outermost position, the balls 3 are maintained in the curled flange 2. When the caster ball 4 and the bearing balls 3 are in this position, the casing may be turned to its proper position, whereupon the bearing balls 6 may be dropped into the casing, the balls striking the surface of the caster ball 4 and readily finding their positions within the bulged portion 5 of the casing. When the cap 7 is placed in its proper position to close the upper end of the casing and secured thereto, the caster is ready to be applied to any desired article of furniture to support the same on the floor, and as the caster ball 4 is the only portion of the device which engages the floor, my improved caster may be used in connection with highly polished floors without danger of scratching the same as the articles of furniture are pushed over the floor.

Having thus fully described my invention, what I desire to claim and secure by Letters Patent is:—

A caster comprising a casing having its lower edge bent upon itself to form a raceway, a series of bearing balls arranged within the race-way, a caster ball arranged in the casing and adapted to rest upon said bearing balls, a portion of the caster ball being extended through the lower end of the casing, said casing being provided adjacent its upper end with an outwardly projecting bulged portion, a series of relatively larger bearing balls arranged within the bulged portion of the casing to engage against the caster ball at a point above its horizontal axis of rotation, a cap having a groove formed in its under face adjacent its marginal edge, whereby to receive the upper end of the casing, screw members extending through the other wall of the cap and the upper end of the casing, for detachably securing the cap to the casing, and the under face of said cap within the casing having a groove formed therein, said groove in conjunction with the bulged portion of the casing forming a race-way for the larger bearing balls, to hold the same in engagement with the caster balls.

In testimony whereof I hereunto affix my signature in the presence of two witnesses.

RICHARD E. TOMPKINS.

Witnesses:
   GEORG J. MILLER,
   EDWARD O. NEWTON.